(12) United States Patent
Shin et al.

(10) Patent No.: US 12,461,426 B2
(45) Date of Patent: Nov. 4, 2025

(54) CAMERA MODULE

(71) Applicant: Samsung Electro-Mechanics Co., Ltd., Suwon-si (KR)

(72) Inventors: Jun Sup Shin, Suwon-si (KR); Young Bok Yoon, Suwon-si (KR); Bo Sung Seo, Suwon-si (KR); Nam Ki Park, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 1030 days.

(21) Appl. No.: 17/360,722

(22) Filed: Jun. 28, 2021

(65) Prior Publication Data

US 2022/0075240 A1 Mar. 10, 2022

(30) Foreign Application Priority Data

Sep. 9, 2020 (KR) .......................... 10-2020-0115537

(51) Int. Cl.
*G03B 5/02* (2021.01)

(52) U.S. Cl.
CPC ........ *G03B 5/02* (2013.01); *G03B 2205/0038* (2013.01)

(58) Field of Classification Search
CPC .......... G02B 7/04; G02B 7/023; G02B 27/40; G02B 27/64; G02B 2207/117; G02B 7/02; G02B 7/08; G02B 7/102; G02B 27/646; G03B 3/00; G03B 3/10; G03B 30/00; G03B 5/00; G03B 5/02; G03B 2205/0007; G03B 2205/0038; G03B 2205/0053; G03B 2205/0069; G03B 2217/002; G03B 17/12; H04N 23/51; H04N 23/54; H04N 23/57; H04N 23/60; H04N 5/225; H04N 5/2254;
(Continued)

(56) References Cited

U.S. PATENT DOCUMENTS 9,977,254 B2 * 5/2018 Kim .................... G03B 5/00
10,747,013 B2 8/2020 Lim
(Continued)

FOREIGN PATENT DOCUMENTS

| CN | 101533203 A | 9/2009 |
| CN | 106707454 A | 5/2017 |

(Continued)

OTHER PUBLICATIONS

English translation of KR 20100006629. (Year: 2010).*
(Continued)

*Primary Examiner* — Jie Lei
(74) *Attorney, Agent, or Firm* — NSIP Law

(57) ABSTRACT

A camera module includes a housing, a lens barrel configured to be movable in an optical axis direction, a barrel holder coupled to the lens barrel and disposed inside of the housing, a lens barrel driving unit configured to drive the lens barrel in the optical axis direction, including a driving magnet and a driving coil, and a position restoration member configured to face the driving magnet in a direction intersecting an optical axis, where a total length of the position restoration member in the optical axis direction is less than a total length of the driving magnet in the optical axis direction, to limit a displacement of the lens barrel in the optical axis direction.

20 Claims, 9 Drawing Sheets

(58) Field of Classification Search
CPC . H04N 5/2257; H04N 5/2328; H04N 5/23287
USPC ....... 359/824, 703, 704, 823, 813, 814, 819,
359/557, 554; 396/52–55
See application file for complete search history.

(56) References Cited

U.S. PATENT DOCUMENTS

| | | | |
|---|---|---|---|
| 11,467,368 B2 * | 10/2022 | Lee | .................. G03B 30/00 |
| 11,567,290 B2 * | 1/2023 | Wu | .................. H02K 41/0356 |
| 2009/0232483 A1 | 9/2009 | Anshita | |
| 2016/0154204 A1 | 6/2016 | Lim et al. | |
| 2016/0299349 A1 | 10/2016 | Cho | |
| 2017/0139225 A1 | 5/2017 | Lim | |
| 2018/0239217 A1 * | 8/2018 | Konuma | .................. G02B 7/04 |
| 2018/0364445 A1 | 12/2018 | Osaka et al. | |
| 2019/0196137 A1 * | 6/2019 | Ushioda | .................. G03B 13/36 |
| 2020/0007721 A1 | 1/2020 | Jeong et al. | |
| 2020/0012068 A1 | 1/2020 | Lim et al. | |
| 2020/0033699 A1 * | 1/2020 | Kim | .................. G03B 5/04 |

FOREIGN PATENT DOCUMENTS

| | | | | | |
|---|---|---|---|---|---|
| CN | 110691188 | A | 1/2020 | | |
| JP | 2017-049343 | A | 3/2017 | | |
| JP | 2019-003148 | A | 1/2019 | | |
| JP | 6463304 | B2 | 1/2019 | | |
| KR | 10-2008-0054838 | A | 6/2008 | | |
| KR | 20100006629 | | * | 1/2010 | ............. G03B 13/36 |
| KR | 20100006629 | A | * | 1/2010 | |
| KR | 10-2012-0061283 | A | 6/2012 | | |
| KR | 10-2016-0064941 | A | 6/2016 | | |
| KR | 10-2016-0121298 | A | 10/2016 | | |
| KR | 10-1792431 | B1 | 10/2017 | | |
| KR | 10-2020-0001774 | A | 1/2020 | | |
| WO | WO 2016/137081 | A1 | 9/2016 | | |

OTHER PUBLICATIONS

Korean Office Action issued on Nov. 19, 2021 in corresponding Korean Patent Application No. 10-2020-0115537. (6 pages in English and 5 pages in Korean).

Chinese Office Action issued on Mar. 25, 2024, in counterpart Chinese Patent Application No. 202111001856.7 (4 pages in English, 8 pages in Chinese).

* cited by examiner

CAMERA MODULE

CROSS-REFERENCE TO RELATED APPLICATION

This application claims the benefit under 35 USC 119(a) of Korean Patent Application No. 10-2020-0115537 filed on Sep. 9, 2020 in the Korean Intellectual Property Office, the entire disclosure of which is incorporated herein by reference for all purposes.

BACKGROUND

1. Field

The following description relates to a camera module.

2. Description of Related Art

Camera modules may include lens barrels accommodating lenses. Such lens barrels may be configured to be movable inside a camera module when implementing autofocusing or optical image stabilization (OIS) of the camera module. For example, a lens barrel may move in the optical axis direction or in a direction intersecting the optical axis within a housing of the camera module. Typically, controlled movement of the lens barrel is implemented by the camera module. However, other movement of such a lens barrel, e.g., due to an external impact such as when the user quickly walks or runs while holding a corresponding mobile terminal equipped with the camera module, may also typically occur. Such movement may further result in collisions between the lens barrel and other members of the typical camera module.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a camera module includes a housing, a lens barrel disposed in the housing, a lens barrel driving unit including a driving magnet and a driving coil, configured to drive the lens barrel in an optical axis direction, and a position restoration member disposed to face the driving magnet, wherein a conditional expression $Yh < (Mh - AFL/2)$ is satisfied, where Yh is a total length of the position restoration member in the optical axis direction, Mh is a total length of the driving magnet in the optical axis direction, and AFL is a maximum displacement of the lens barrel in the optical axis direction.

The camera module may further include one or more ball bearings disposed between the lens barrel and the housing.

The lens barrel driving unit may include a first driving magnet and a first driving coil configured to provide driving force to one side of the lens barrel, and a second driving magnet and a second driving coil configured to provide another driving force to another side of the lens barrel.

The first driving magnet may be configured to have a total length (ML1) that is different from a total length (ML2) of the second driving magnet.

A ratio (ML1/ML2) between the total length (ML1) of the first driving magnet and the total length (ML2) of the second driving magnet may be 0.3 to 0.7.

The position restoration member may be disposed to face the first driving magnet, and Mh may be the total length of the first driving magnet in the optical axis direction, and the camera module may further include another position restoration member disposed to face the second driving magnet.

Another conditional expression $Yh2 < (Mh2 - AFL/2)$ may be satisfied, where Yh2 may be a total length of the other position restoration member in the optical axis direction, and Mh2 may be a total length of the second driving magnet in the optical axis direction.

The total length (Yh) of the position restoration member in the optical axis direction may be less than the total length (Mh) of the driving magnet in the optical axis direction.

In one general aspect, a camera module includes a housing, a lens barrel configured to be movable in an optical axis direction, a barrel holder coupled to the lens barrel and disposed inside of the housing, a lens barrel driving unit configured to drive the lens barrel in the optical axis direction, and including a driving magnet and a driving coil, and a position restoration member configured to face the driving magnet in a direction intersecting an optical axis, wherein a total length of the position restoration member in the optical axis direction is less than a total length of the driving magnet in the optical axis direction, to limit a displacement of the lens barrel in the optical axis direction.

The position restoration member may apply a passive attractive force to the driving magnet to limit the displacement of the lens barrel in the optical axis direction.

The camera module may further include one or more ball bearings disposed between a guide groove of the housing and a guide groove of the barrel holder.

The one or more ball bearings may include two or more ball bearings, where the two or more ball bearing may be respectively disposed at portions of diagonal corners of the housing and the barrel holder.

The one or more ball bearings may include two or more ball bearings, where the two or more ball bearing may be disposed between one surface of the housing and one surface of the barrel holder.

The lens barrel driving unit may include a first driving magnet and a first driving coil configured to provide driving force to one side of the lens barrel, and may include a second driving magnet and a second driving coil configured to provide another driving force to another side of the lens barrel.

The first driving magnet may be configured to have a total length (ML1) different from a total length (ML2) of the second driving magnet.

A ratio (ML1/ML2) between the total length (ML1) of the first driving magnet and the total length (ML2) of the second driving magnet may be 0.3 to 0.7.

The position restoration member may be disposed to face the first driving magnet, Yh1 may be the total length of the position restoration member in the optical axis direction, Mh1 may be the total length of the first driving magnet in the optical axis direction, AFL is a maximum displacement of the lens barrel in the optical axis direction, and a conditional expression $Yh1 < (Mh1 - AFL/2)$ may be satisfied, and the camera module may further include another position restoration member disposed to face the second driving magnet, where Yh2 may be a total length of the other position restoration member in the optical axis direction, Mh2 may be a total length of the second driving magnet in the optical axis direction, and another conditional expression $Yh2 < (Mh2 - AFL/2)$ may be satisfied.

The camera module may further include a circuit board disposed to surround an open portion of the housing and electrically connected to the driving coil.

The camera module may further include a shield can that is coupled to the housing and configured to block external electromagnetic waves.

The camera module may further include a clip member coupled to the barrel holder, and a buffer member disposed on the clip member.

Other features and aspects will be apparent from the following detailed description, the drawings, and the claims.

Figure 1:
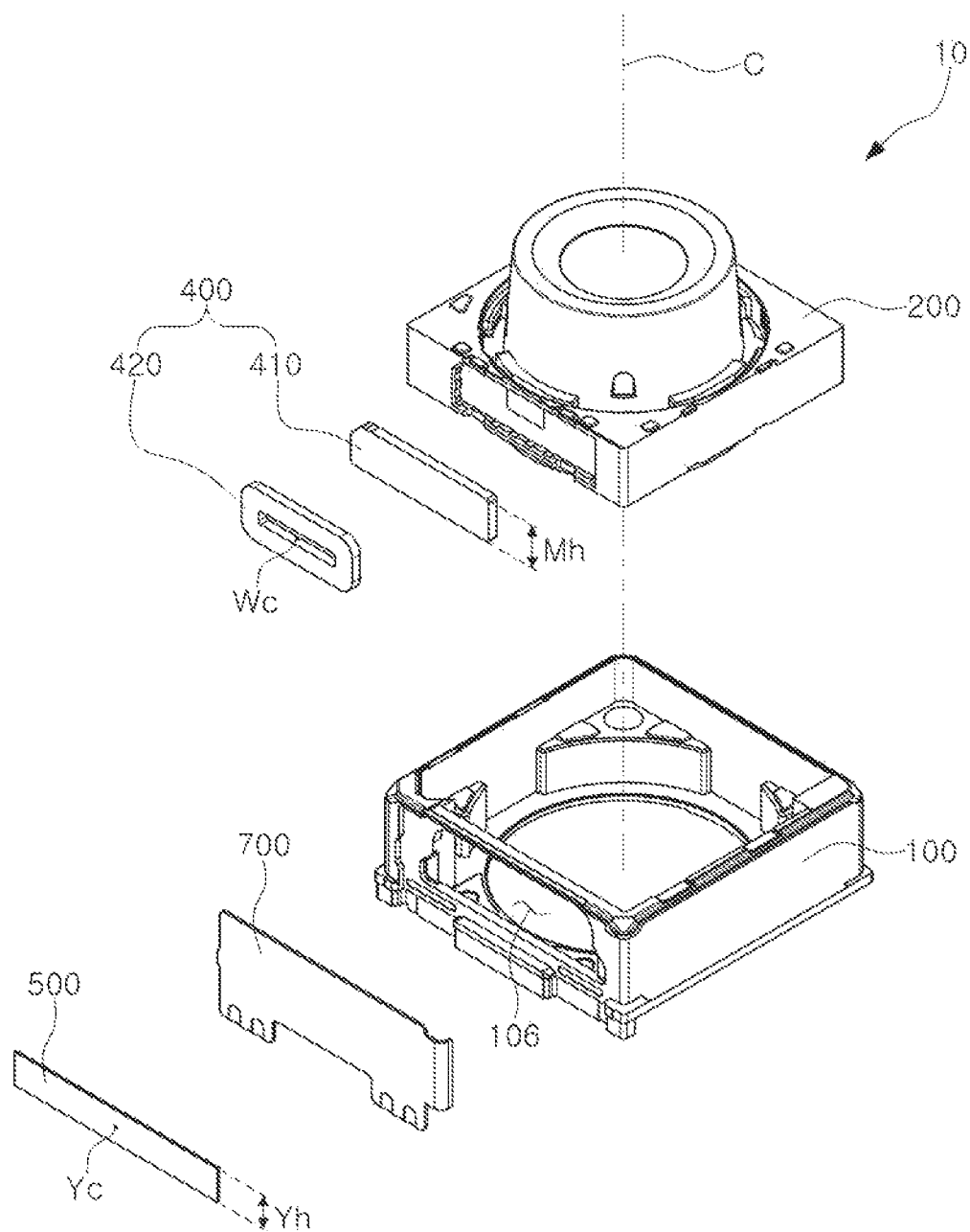
FIG. 1 is an exploded perspective view of an example camera module, according to one or more embodiments.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness, noting that omissions of features and their descriptions are also not intended to be admissions of their general knowledge.

The features described herein may be embodied in different forms, and are not to be construed as being limited to the examples described herein. Rather, the examples described herein have been provided to illustrate some of the many possible ways of implementing the methods, apparatuses, and/or systems described herein that will be apparent after an understanding of the disclosure of this application.

Herein, it is to be noted that use of the term "may" with respect to an embodiment or example, e.g., as to what an embodiment or example may include or implement, means that at least one embodiment or example exists in which such a feature is included or implemented while all examples and examples are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape occurring during manufacturing.

The features of the examples described herein may be combined in various ways as will be apparent after gaining an understanding of the disclosure of this application. Further, although the examples described herein have a variety of configurations, other configurations are possible as will be apparent after gaining an understanding of the disclosure of this application. The drawings may not be to scale, and the relative sizes, proportions, and depictions of elements in the drawings may be exaggerated for clarity, illustration, and convenience.

As noted above, in a typical camera module a lens barrel may be actively moved to perform intended functions of the camera module, but may also be moved passively by external impacts. For example, such a lens barrel in the typical camera module may shake in the optical axis direction within the camera module according to the activity type of the mobile terminal user. Such shaking of the lens barrel may cause noise and camera module failure.

Figure 2:
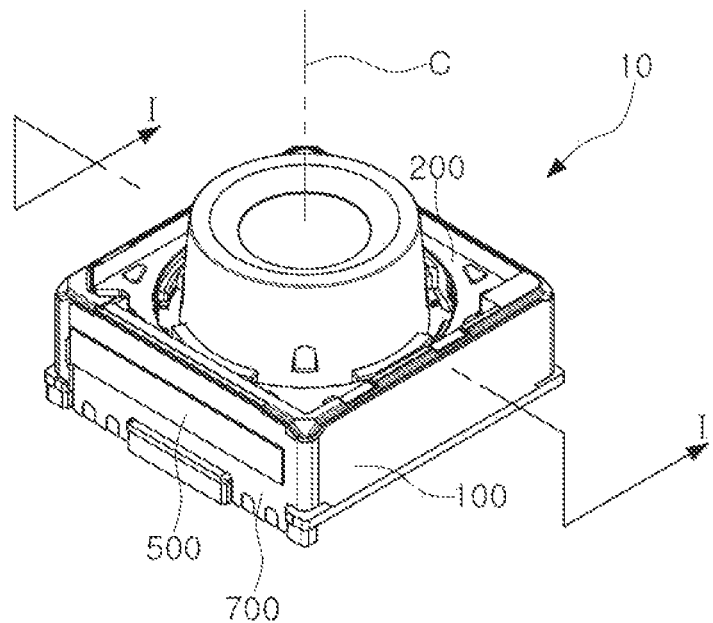
FIG. 2 is a perspective view of an example camera module, according to one or more embodiments.

FIG. 1 is an exploded perspective view of an example camera module, according to one or more embodiments. Further, FIG. 2 is a perspective view of an example camera module, according to one or more embodiments.

For example, one or more embodiments may include a portable electronic product that includes a camera module. For example, the portable or mobile electronic product or device may be a mobile phone, a notebook computer, or the like. However, additional embodiments other than such electronic products also exist with an example camera module. Accordingly, examples are not limited to such portable or mobile electronic products, and embodiments exist with all electronic devices in which a camera module is included, including examples with one or more camera modules, on one or more surfaces of the electronic products.

The camera module includes a lens barrel. The lens barrel may be moved inside of the camera module to perform unique functions of the camera module. For example, the lens barrel may move in the direction of the optical axis.

One or more embodiments may reduce or prevent passive movements of the lens barrel within the camera module. In an example, the camera module includes a driving magnet and a position restoration member, and is configured to significantly reduce shaking of a lens barrel due to external impacts, for example.

For example, the camera module 10 according to an example includes a housing 100, a lens barrel 200, a driving unit 400, and a position restoration member 500. However, the configuration of the camera module 10 is not limited to the above-described configurations. For example, the camera module 10 may further include a substrate 700 to be connected to some components of the driving unit 400, and may include image sensor.

The housing 100 may be configured in a polyhedral shape having a substantially quadrangular cross section and a predetermined height. However, the shape of the housing 100 is not limited to a polyhedral shape having a quadrangular cross section. The housing 100 is configured to accommodate the lens barrel 200. For example, a space capable of accommodating at least a portion of the lens barrel 200 may be formed inside of the housing 100. The housing 100 is configured to allow movement of the lens barrel 200 in an optical axis (C) direction. For example, the upper and lower surfaces of the housing 100 may be open. The housing 100 may be configured to enable the arrangement of the driving unit 400. For example, an opening 106 may be formed in one side of the housing 100 in such a manner that different members of the driving unit 400 may be disposed to face each other directly.

The lens barrel 200 includes one or more lenses. For example, the lens barrel 200 may include four or more lenses. However, the number of lenses accommodated in the lens barrel 200 is not limited to four. For example, the lens barrel 200 may be configured to accommodate 3 or less or 5 or more lenses. The lens barrel 200 is configured to be accommodated in the housing 100. For example, the cross-sectional size of the lens barrel 200 may be less than the inner cross-sectional size of the housing 100. The lens barrel 200 may move in the optical axis C direction. For example, the lens barrel 200 may be moved in the direction of the optical axis C while being accommodated in the housing 100 by the driving force of the driving unit 400.

The driving unit 400 may provide driving force required for driving the lens barrel 200. For example, the driving unit 400 may drive the lens barrel 200 in the direction of the optical axis C through magnetic force. The driving unit 400 may include a driving magnet 410 and a driving coil 420. The driving magnet 410 may be disposed on the lens barrel 200. For example, the driving magnet 410 may be disposed on one side of the lens barrel 200. The driving magnet 410 may be disposed to substantially face the driving coil 420. For example, the driving magnet 410 and the driving coil 420 may be disposed to face each other through the opening 106 of the housing 100. The driving coil 420 may be disposed in the opening 106 of the housing 100. For example, the driving coil 420 may be disposed inside of the opening 106 using the substrate 700 attached to the side surface of the housing 100.

The position restoration member 500 may be disposed to directly or indirectly face the driving magnet 410 of the driving unit 400. For example, the position restoration member 500 may be disposed outside of the opening 106 using the substrate 700. The position restoration member 500 may be configured to generate an attractive force of a predetermined magnitude through interaction with the driving magnet 410. For example, the position restoration member 500 may be formed of a magnetic material. However, one or more embodiments may further include the position restoration member 500 being formed of materials in addition to magnetic material(s). For example, the position restoration member 500 may be formed of a mixture or a composite of a magnetic material and another material. The position restoration member 500 may have a predetermined size. For example, a total height Yh of the position restoration member 500 may be less than a total height Mh of the driving magnet 410. A center Yc of the position restoration member 500 may be disposed to substantially coincide with a winding center Wc of the driving coil 420. However, one or more embodiments also include the center Yc of the position restoration member 500 not being disposed to coincide with the winding center Wc of the driving coil 420. For example, the center Yc of the position restoration member 500 may be disposed to be deflected in the direction of the optical axis C from the winding center Wc of the driving coil 420.

The substrate 700 may be electrically connected to the driving unit 400. For example, the substrate 700 may be electrically connected to the driving coil 420 of the driving unit 400. The substrate 700 may include a configuration for directly or indirectly controlling the driving unit 400. For example, the substrate 700 may include an electric circuit or electronic component for changing, controlling, or transmitting an amount of current supplied to the driving coil 420 or a direction of the supplied current. The substrate 700 may be configured in a form capable of bending deformation. For example, the substrate 700 may be configured in the form of an FPCB.

Figure 3:
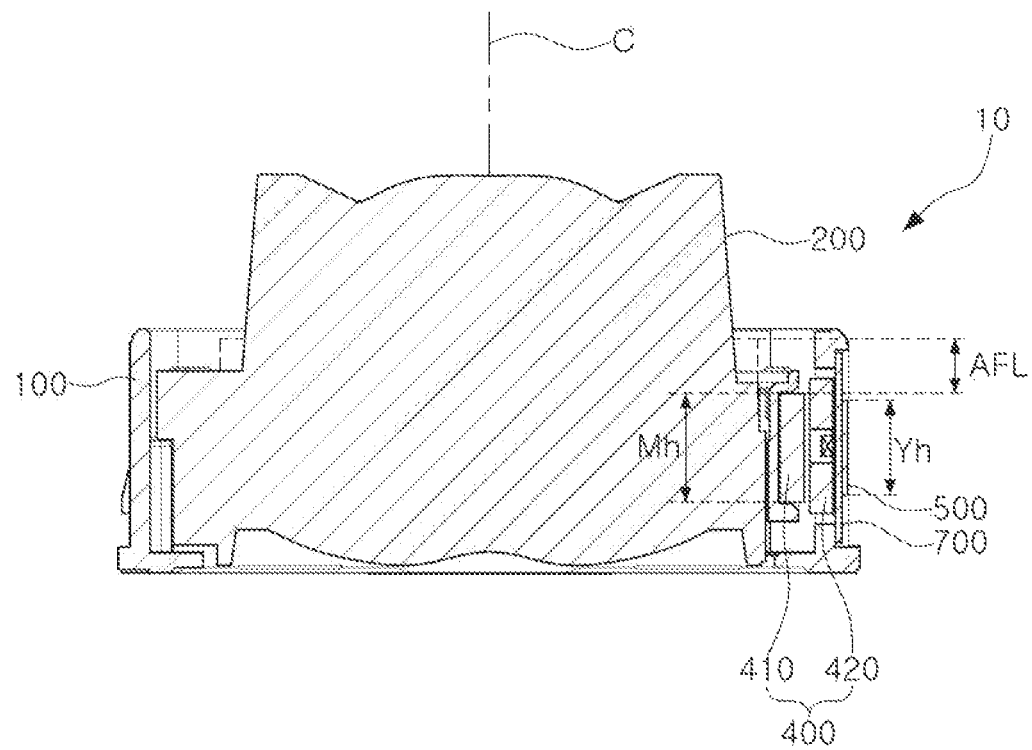
FIG. 3 is a cross-sectional view of an example camera module, according to one or more embodiments.

For example, as demonstrated in FIG. 3, the lens barrel 200 may move in the direction of the optical axis C as described above. For example, the lens barrel 200 may be moved by a predetermined maximum or total displacement AFL by the driving force of the driving magnet 410 and the driving coil 420.

The position restoration member 500 may be configured to partially limit the movement of the lens barrel 200. For example, the position restoration member 500 may be configured to reduce a phenomenon in which the lens barrel 200 moves by the displacement AFL or more due to external impacts, or the lens barrel 200 is regularly or irregularly shaken due to external impacts. For example, the position restoration member 500 may act to suppress the movement of the lens barrel 200 or gradually reduce the width of the movement through the interaction (attractive force) with the driving magnet 410 fixed to the lens barrel 200. The attractive force generated between the position restoration member 500 and the driving magnet 410 is less than the attractive force generated between the driving magnet 410 and the driving coil 420 in a driving state of the lens barrel 200, and may be greater than the attractive force generated between the driving magnet 410 and the driving coil 420 in a non-driving state of the lens barrel 200. The position restoration member 500 may form a predetermined size relationship with the displacement AFL of the lens barrel 200 and the driving magnet 410. For example, the total height Yh of the position restoration member 500 may be less than a size (Mh−AFL/2) obtained by subtracting ½ of the displacement AFL from the total height Mh of the driving magnet 410. In addition, the total height Yh of the position restoration member 500 may be less than the total height Mh of the driving magnet 410. The position restoration member 500 may be disposed to always face an area having a considerable size of the driving magnet 410. For example, the position restoration member 500 may be disposed to always face an area of ½ or more of the driving magnet 410.

In addition, the position restoration member 500 may satisfy the following relational expression:

$$Yh/2 < Mh - AFL/2$$

In detail, the height (Yh/2) from the center of the position restoration member 500 to one end (upper or lower end) of the position restoration member 500 is less than the size provided by excluding the displacement (one-half of the total displacement AFL) of the lens barrel 200 in one direction from the height Mh of the driving magnet 410.

The camera module 10 configured as above may reduce or suppress shaking of the lens barrel 200 due to external impacts. For example, when the lens barrel 200 moves upwardly or vibrates due to external impacts, the position restoration member 500 may pull the lens barrel 200 downwardly through interaction (attractive force) with the driving magnet 410. On the contrary, when the lens barrel 200 moves downwardly or vibrates due to external impacts, the position restoration member 500 may raise the lens barrel 200 upwardly through an interaction (attractive force) with the driving magnet 410.

Accordingly, the camera module according to one or more embodiments may reduce noise due to the rapid movement or vibration of the lens barrel 200, as well as reducing sudden movement or vibrations of the lens barrel 200 due to external impacts.

Figure 4:
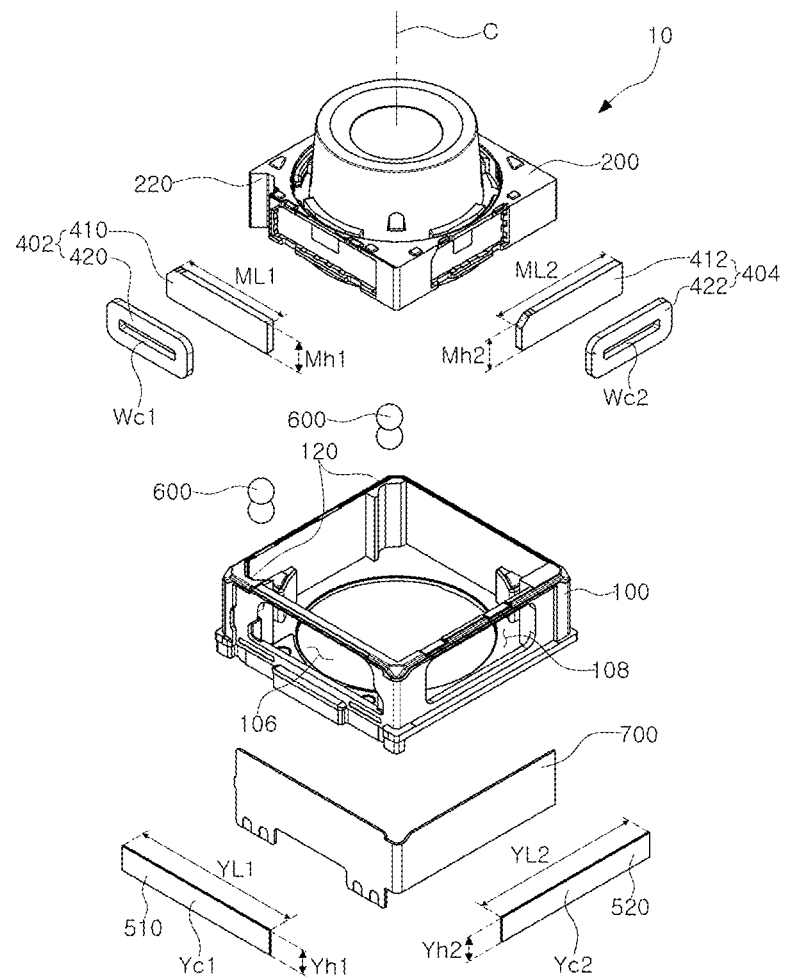
FIG. 4 is an exploded perspective view of an example camera module, according to one or more embodiments.
Figure 5:
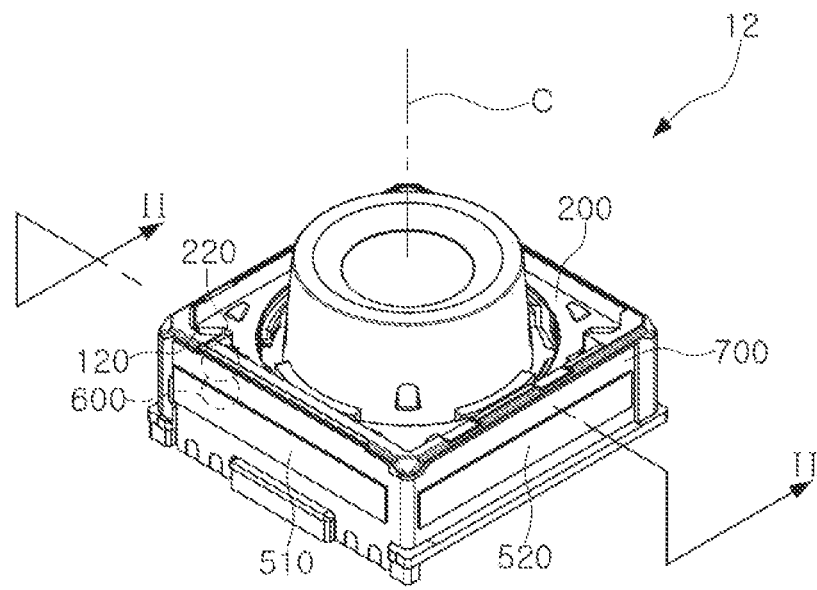
FIG. 5 is a perspective view of an example camera module, according to one or more embodiments.
Figure 6:
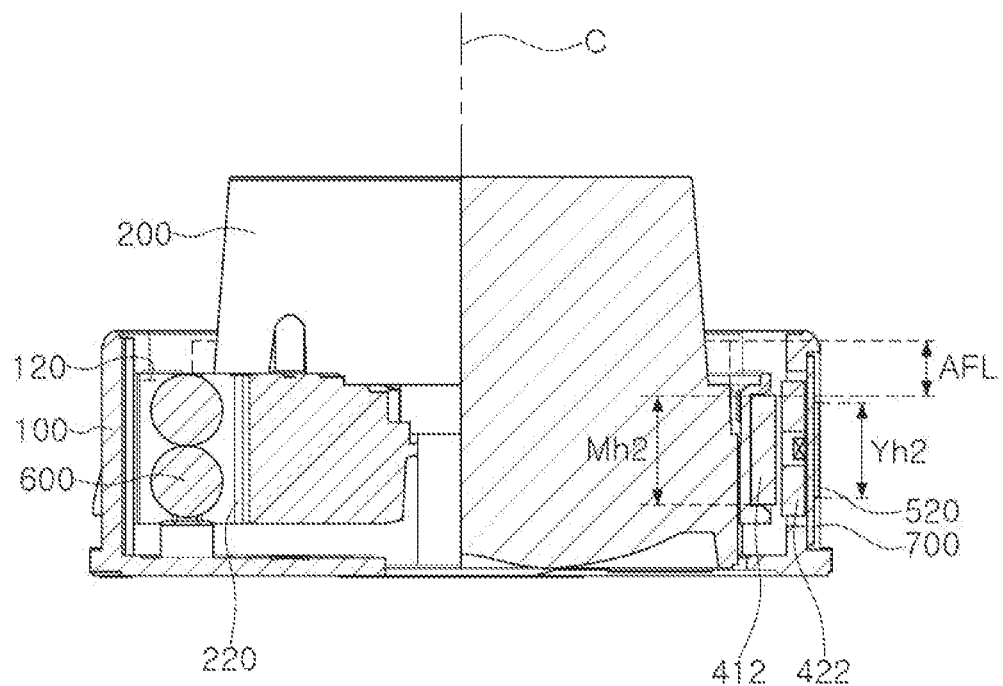
FIG. 6 is a cross-sectional view of an example camera module, according to one or more embodiments.

FIG. 4 is an exploded perspective view of an example camera module, according to one or more embodiments. FIG. 5 is a perspective view of an example camera module, according to one or more embodiments. FIG. 6 is a cross-sectional view of an example camera module, according to one or more embodiments.

For example, as demonstrated in FIGS. 4-6, camera module 12 according to one or more embodiments includes a housing 100, a lens barrel 200, driving units 402 and 404, position restoration members 510 and 520, and a substrate 700. However, the configuration of the camera module 12 is not limited to the above-described configurations. For example, the camera module 12 may further include a ball bearing 600 and an image sensor.

The housing 100 may be configured in a polyhedral shape having a substantially quadrangular cross section and a predetermined height. However, the shape of the housing 100 is not limited to a polyhedral shape having a quadrangular cross section. The housing 100 is configured to accommodate the lens barrel 200. For example, a space capable of accommodating at least a portion of the lens barrel 200 may be formed inside of the housing 100. The housing 100 is configured to allow movement of the lens barrel 200 in the optical axis (C) direction. For example, the upper and lower surfaces of the housing 100 may be open. The housing 100 may be configured to enable the arrangement of the driving units 402 and 404. For example, openings 106 and 108 may be formed in one side of the housing 100 such that different members of the driving units 402 and 404 may be disposed to face each other directly.

The lens barrel 200 includes one or more lenses. For example, the lens barrel 200 may include four or more lenses. However, the number of lenses accommodated in the lens barrel 200 is not limited to four. For example, the lens barrel 200 may be configured to accommodate 3 or less or 5 or more lenses. The lens barrel 200 is configured to be accommodated in the housing 100. For example, the cross-sectional size of the lens barrel 200 may be less than the inner cross-sectional size of the housing 100. The lens barrel 200 may move in the optical axis C direction. For example, the lens barrel 200 may be moved in the direction of the optical axis C while being accommodated in the housing 100, by the driving force of the driving units 402 and 404.

The driving units 402 and 404 may provide driving force required for driving the lens barrel 200. For example, the driving units 402 and 404 may drive the lens barrel 200 in the direction of the optical axis C through magnetic force. The driving units 402 and 404 may include driving magnets 410 and 412 and driving coils 420 and 422. The driving magnets 410 and 412 may be disposed on the lens barrel 200. For example, the driving magnets 410 and 412 may be disposed on multiple sides of the lens barrel 200. The driving magnets 410 and 412 may be disposed to substantially face the driving coils 420 and 422. For example, the driving magnets 410 and 412 and the driving coils 420 and 422 may be disposed to face each other through the openings 106 and 108 of the housing 100. The driving coils 420 and 422 may be disposed in the openings 106 and 108 of the housing 100, respectively. For example, the driving coils 420 and 422 may be disposed inside of the openings 106 and 108 using the substrate 700 surrounding the openings 106 and 108 of the housing 100, respectively. The first driving magnet 410 and the second driving magnet 412 may have different sizes. For example, a total length ML1 of the first driving magnet 410 may be greater than a total length ML2 of the second driving magnet 412. As another example, the length ML2 of the second driving magnet 412 may be about 0.3 to 0.7 of the length ML1 of the first driving magnet 410. For reference, the first driving coil 420 and the second driving coil 422 may also have the same or a similar size relationship as that of the first driving magnet 410 and the second driving magnet 429412.

The position restoration members 510 and 520 may be disposed to directly or indirectly face the driving magnets 410 and 412 of the driving units 402 and 404. For example, the position restoration members 510 and 520 may be disposed outside of the openings 106 and 108 using the substrate 700. The position restoration members 510 and 520 may be configured to generate an attractive force of a predetermined magnitude through interaction with the driving magnets 410 and 412. For example, the position restoration members 510 and 520 may be formed of a magnetic material. However, one or more embodiments also include the position restoration members 510 and 520 being only partially formed with a magnetic material, i.e., being formed of material(s) in addition to magnetic material(s). For example, the position restoration members 510 and 520 may be formed of a mixture or a composite of a magnetic material and another material. The position restoration members 510 and 520 may have a predetermined size. For example, respective total heights Yh1 and Yh2 of the position restoration members 510 and 520 may be less than respective total heights Mh1 and Mh2 of the corresponding driving magnets 410 and 412. For example, the height Yh1 of the first position restoration member 510 is less than the height Mh1 of the first driving magnet 410, and the height Yh2 of the second position restoration member 520 is less than the height Mh2 of the second driving magnet 420412. Centers Yc1 and Yc2 of the position restoration members 510 and 520 may be disposed to substantially coincide with winding centers Wc1 and Wc2 of the corresponding driving coils 420 and 422. For example, the center Yc1 of the first position restoration member 510 is disposed to coincide with the winding center Wc1 of the first driving coil 420, and the center Yc2 of the second position restoration member 520 is disposed to coincide with the winding center Wc2 of the second driving coil 422. However, one or more embodiments also include examples where the centers Yc1 and Yc2 of the position restoration members 510 and 520 are not disposed to match the winding centers Wc1 and Wc2 of the corresponding driving coils 420 and 422. For example, the centers Yc1 and Yc2 of the position restoration members 510 and 520 may be disposed to be deflected in the direction of the optical axis C from the winding centers Wc1 and Wc2 of the driving coils 420 and 422.

The ball bearing 600 may be disposed between the housing 100 and the lens barrel 200. For example, the ball bearing 600 may be disposed between a guide groove 120 of the housing 100 and a guide groove 220 of the lens barrel 200. The ball bearing 600 is configured to enable smooth driving of the lens barrel 200. For example, the ball bearing 600 may be in point contact with the lens barrel 200 while blocking direct contact between the lens barrel 200 and the housing 100. Accordingly, the lens barrel 200 may move smoothly in the direction of the optical axis C while being in point contact with the ball bearing 600. The ball bearing 600 may be configured in plural. For example, three ball bearings 600 may be sequentially disposed between the guide groove 120 of the housing 100 and the guide groove 220 of the lens barrel 200. However, the number of ball bearings 600 is not limited to three. For example, two or four ball bearings 600 may be disposed between the guide groove 120 of the housing 100 and the guide groove 220 of the lens barrel 200.

The substrate 700 may be electrically connected to the driving units 402 and 404. For example, the substrate 700 may be electrically connected to the driving coils 420 and 422 of the driving units 402 and 404. The substrate 700 may include a component for directly or indirectly controlling the driving units 402 and 404. For example, the substrate 700 may include an electric circuit or electronic component for changing, controlling, or transmitting the amount of current supplied to the driving coils 420 and 422 or the direction of the supplied current. The substrate 700 may be configured in a form capable of bending deformation. For example, the substrate 700 may be configured in the form of an FPCB.

Further, as demonstrated in FIG. 6, the lens barrel 200 may move in the direction of the optical axis C as described above. For example, the lens barrel 200 may be moved by a predetermined maximum or total displacement AFL by the driving force of the driving magnets 410 and 412 and the driving coils 420 and 422.

The position restoration members 510 and 520 may be configured to partially limit the movement of the lens barrel 200. For example, the position restoration members 510 and 520 may be configured to reduce a phenomenon in which the lens barrel 200 moves by the displacement (AFL) or more due to external impacts or the lens barrel 200 is regularly or irregularly shaken due to external impacts. For example, the position restoration members 510 and 520 may act to suppress the movement of the lens barrel 200 or to gradually reduce the width of the movement through interaction (attractive force) with the driving magnets 410 and 412 fixed to the lens barrel 200. The attractive force generated between the position restoration members 510 and 520 and the driving magnets 410 and 412 is less than the attractive force generated between the driving magnets 410 and 412 and the driving coils 420 and 422 in the driving state of the lens barrel 200, and may be greater than the attractive force generated between the driving magnets 410 and 412 and the driving coils 420 and 422 in the non-driving state of the lens barrel 200. The position restoration members 510 and 520 may form a predetermined size relationship with the displacement AFL of the lens barrel 200 and the driving magnets 410 and 412. For example, the total height Yh1 of the first position restoration member 510 may be less than a sum (Mh1+AFL/2) of the total height Mh1 of the first driving magnet 410 and one-half of the displacement AFL, and the total height Yh2 of the second position restoration member 520 may be less than a sum (Mh2+AFL/2) of the total height Mh2 of the second driving magnet 412 and one-half of the displacement AFL. In addition, the total heights Yh1 and Yh2 of the position restoration members 510 and 520 may be respectively less than the total heights Mh1 and Mh2 of the driving magnets 410 and 412, facing each other.

The camera module 12 configured as above may reduce or suppress shaking of the lens barrel 200 due to external impacts. For example, when the lens barrel 200 moves upwardly or vibrates due to external impacts, the position restoration members 510 and 520 may interact with the driving magnets 410 and 412 to pull the lens barrel 200 downwardly through attractive force. Conversely, when the lens barrel 200 moves downwardly or vibrates due to external impacts, the position restoration members 510 and 520 pull the lens barrel 200 upwardly through interaction (attractive force) with the driving magnets 410 and 412. Therefore, the camera module according to one or more embodiments may reduce not only the sudden movement or vibration of the lens barrel 200 due to external impacts, but also the noise due to the sudden movement or vibration of the lens barrel 200.

In addition, the camera module according to one or more embodiments may secure horizontal stability of the lens barrel 200. For example, the driving magnets 410 and 412 disposed on one side and another side of the lens barrel 200 may reduce the phenomenon in which the lens barrel 200 is shaken or tilted in a direction oblique to the optical axis C. Accordingly, the camera module according to one or more embodiments may improve reliability of movement of the lens barrel 200 in the optical axis direction.

Figure 7:
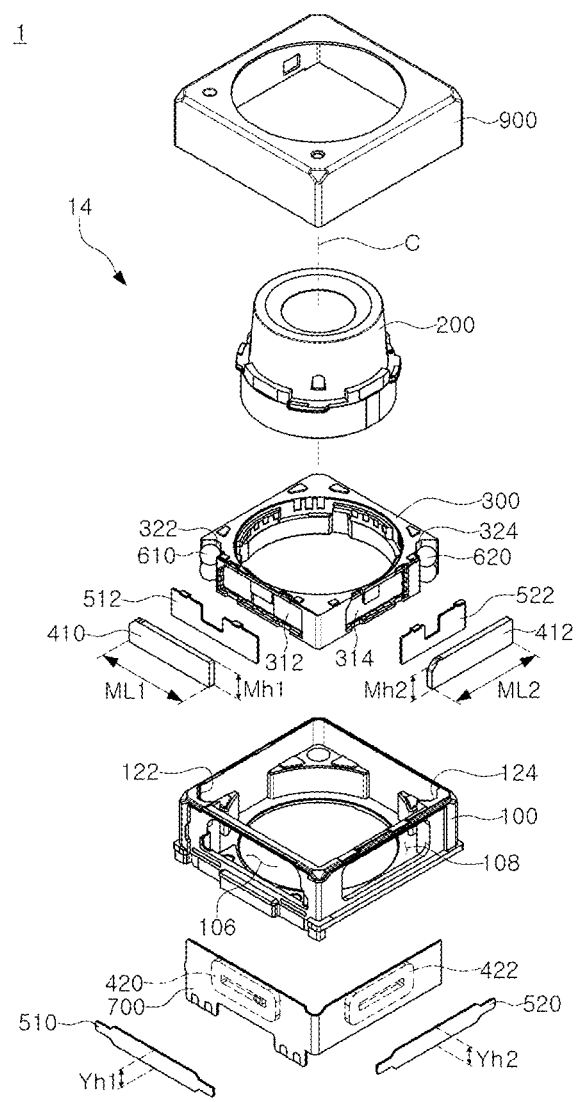
FIG. 7 is an exploded perspective view of an example camera module, according to one or more embodiments.
Figure 8:
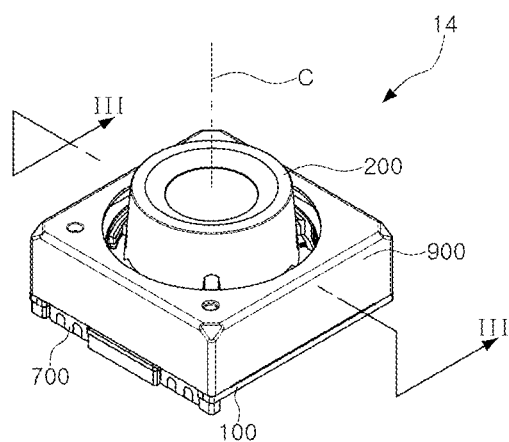
FIG. 8 is a perspective view of an example camera module, according to one or more embodiments.
Figure 9:
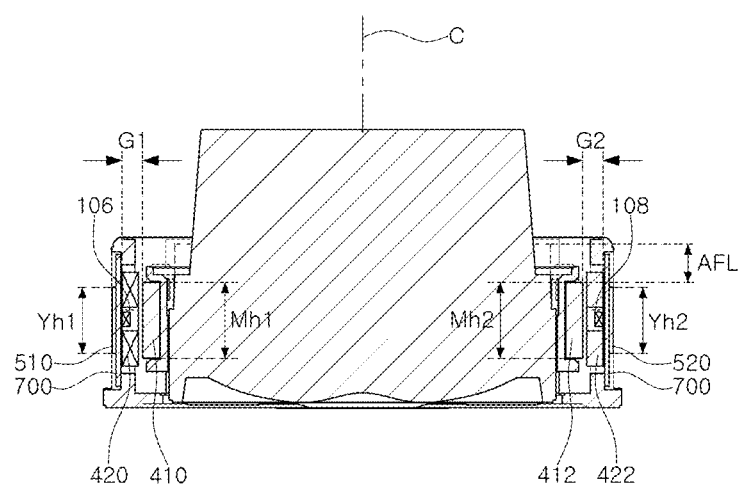
FIG. 9 is a cross-sectional view of an example camera module, according to one or more embodiments.

FIG. 7 is an exploded perspective view of an example camera module, according to one or more embodiments. FIG. 8 is a perspective view of an example camera module, according to one or more embodiments. FIG. 9 is a cross-sectional view of an example camera module, according to one or more embodiments.

For example, as demonstrated in FIGS. 4 and 7-9, camera module 14 according to one or more embodiments includes a housing 100, a lens barrel 200, a barrel holder 300, driving units 402 and 404, position restoration members 510 and 520, and a substrate 700. However, the configuration of the camera module 14 is not limited to the above-described configurations. For example, the camera module 14 may further include a ball bearing 600, yoke members 512 and 522, a shield can 900, and an image sensor.

The housing 100 may be configured in a polyhedral shape having a substantially quadrangular cross section and a predetermined height. However, the shape of the housing 100 is not limited to a polyhedral shape having a quadrangular cross section. The housing 100 is configured to accommodate the lens barrel 200. For example, a space capable of accommodating at least a portion of the lens barrel 200 may be formed inside of the housing 100. The housing 100 is configured to allow movement of the lens barrel 200 in the optical axis (C) direction. For example, the upper and lower surfaces of the housing 100 may be open. The housing 100 may be configured to enable the arrangement of the driving units 402 and 404. For example, openings 106 and 108 may be formed in one side of the housing 100 such that different members of the driving units 402 and 404 may be disposed to face each other directly.

The lens barrel 200 may be formed in a substantially cylindrical shape. However, the shape of the lens barrel 200 is not limited to being cylindrical. The lens barrel 200 includes one or more lenses. For example, the lens barrel 200 may include four or more lenses. However, the number of lenses accommodated in the lens barrel 200 is not limited to four. For example, the lens barrel 200 may be configured to accommodate 3 or less or 5 or more lenses. The lens barrel 200 is configured to be accommodated in the housing 100. For example, the cross-sectional size of the lens barrel 200 may be less than the inner cross-sectional size of the housing 100. The lens barrel 200 may move in the optical axis C direction. For example, the lens barrel 200 may be moved in the direction of the optical axis C while being accommodated in the housing 100, by the driving force of the driving units 402 and 404.

The barrel holder 300 may be coupled to the lens barrel 200. The barrel holder 300 may support the lens barrel 200 such that the lens barrel 200 may be stably moved in the inner space of the housing 100. The lens barrel 200 may be formed in a shape substantially similar to the inner space of the housing 100. For example, the cross-sectional shape of the lens barrel 200 may have the same or similar quadrangular shape as that of the inner space of the housing 100. The barrel holder 300 may provide a space for supporting some components of the driving units 402 and 404. For example, mounting grooves 312 and 314 in which the driving magnets 410 and 412 are to be disposed may be formed in sides of the barrel holder 300.

The driving units 402 and 404 may provide driving force required for driving the lens barrel 200. For example, the driving units 402 and 404 may drive the lens barrel 200 in the direction of the optical axis C through magnetic force. The driving units 402 and 404 may include first driving unit 402 configured to provide driving force to one side of the lens module 200 and the lens barrel 300, and second driving unit 404 configured to provide driving force to the other side of the lens module 200 and the lens barrel 300. The driving units 402 and 404 may include driving magnets 410 and 412 and driving coils 420 and 422. The driving magnets 410 and 412 may be disposed on the barrel holder 300. For example, the driving magnets 410 and 412 may be disposed in mounting grooves 312 and 314 of the barrel holder 300, respectively. The driving magnets 410 and 412 may be disposed to substantially face the driving coils 420 and 422. For example, the driving magnets 410 and 412 and the driving coils 420 and 422 may be disposed to face each other through the openings 106 and 108 of the housing 100. The driving coils 420 and 422 may be disposed in the openings 106 and 108 of the housing 100, respectively. For example, the driving coils 420 and 422 may be disposed inside of the openings 106 and 108 using the substrate 700 surrounding the openings 106 and 108 of the housing 100. The first driving magnet 410 and the second driving magnet 412 may have different sizes. For example, the total length ML1 of the first driving magnet 410 may be greater than the total length ML2 of the second driving magnet 412. As another example, the total length ML2 of the second driving magnet 412 may be about 0.3 to 0.7 of the total length ML1 of the first driving magnet 410.

As another example, the total length ML1 of the first driving magnet 410 and the total length ML2 of the second driving magnet 412 may satisfy the following relational expression:

$$0.3 \leq (ML1/G1)/(ML2/G2) \leq 0.7$$

For reference, G1 is a shortest distance between the first driving magnet 410 and the first position restoration member 510, G2 is a shortest distance between the second driving magnet 412 and the second position restoration member 520, and the first driving coil 420 and the second driving coil 422 may also have the same or similar size relationship to that of the first driving magnet 410 and the second driving magnet 412.

The position restoration members 510 and 520 may be disposed to directly or indirectly face the driving magnets 410 and 412 of the driving units 402 and 404. For example, the position restoration members 510 and 520 may be disposed outside of the openings 106 and 108 using the substrate 700. The position restoration members 510 and 520 may be configured to generate an attractive force of a predetermined magnitude through interaction with the driving magnets 410 and 412. For example, the position restoration member 500 may be formed of a magnetic material. However, one or more example embodiments further include the position restoration members 510 and 520 being formed of materials in addition to magnetic material(s). For example, the position restoration members 510 and 520 may be formed of a mixture or a composite of a magnetic material and another material. The position restoration members 510 and 520 may have a predetermined size. For example, the total heights Yh1 and Yh2 of the position restoration members 510 and 520 may be respectively less than the total heights Mh1 and Mh2 of the corresponding driving magnets 410 and 412. For example, the total height Yh1 of the first position restoration member 510 is less than the total height Mh1 of the first driving magnet 410, and the total height Yh2 of the second position restoration member 520 is less than the total height Mh2 of the second driving magnet 412. The centers Yc1 and Yc2 of the position restoration members 510 and 520 may be disposed to substantially coincide with the winding centers Wc1 and Wc2 of the corresponding driving coils 420 and 422. For example, the center Yc1 of the first position restoration member 510 is disposed to coincide with the winding center Wc1 of the first driving coil 420, and the center Yc2 of the second position restoration member 520 is disposed to coincide with the winding center Wc2 of the second driving coil 422. However, one or more embodiments also include centers Yc1 and Yc2 of the position restoration members 510 and 520 not being disposed to match the winding centers Wc1 and Wc2 of the corresponding driving coils 420 and 422. For example, the centers Yc1 and Yc2 of the position restoration members 510 and 520 may be disposed to be deflected in the direction of the optical axis C from the winding centers Wc1 and Wc2 of the driving coils 420 and 422.

The ball bearings 610 and 620 may be disposed between the housing 100 and the barrel holder 300. For example, the ball bearings 610 and 620 may be disposed between guide grooves 122 and 124 of the housing 100 and guide grooves 322 and 324 of the barrel holder 300. The ball bearings 610 and 620 are configured to enable smooth driving of the lens barrel 200. For example, the ball bearings 610 and 620 may be in point contact with the barrel holder 300 in a state in which direct contact between the barrel holder 300 and the housing 100 is blocked. Accordingly, the lens barrel 200 may move smoothly in the direction of the optical axis C along the barrel holder 300 in point contact with the ball bearings 610 and 620. The ball bearings 610 and 620 may be configured in plural. For example, two pairs of ball bearings 610 and 620 may be sequentially disposed between the guide grooves 122 and 124 of the housing 100 and the guide grooves 322 and 324 of the barrel holder 300. However, the number of ball bearings 610 and 620 is not limited to two pairs. For example, three or more pairs of ball bearings 610 and 620 may be disposed between the guide grooves 122 and 124 of the housing 100 and the guide grooves 322 and 324 of the barrel holder 300. The ball bearings 610 and 620 may be disposed to stably support the lens barrel 200 and the barrel holder 300. For example, the ball bearings 610 and 620 may be disposed at diagonal corner portions of the housing 100 and the barrel holder 300, respectively.

The substrate 700 may be disposed to surround the openings 106 and 108 of the housing 100. The substrate 700 may be electrically connected to the driving units 402 and 404. For example, the substrate 700 may be electrically connected to the driving coils 420 and 422 of the driving units 402 and 404. The substrate 700 may include a component for directly or indirectly controlling the driving units 402 and 404. For example, the substrate 700 may include an electric circuit or electronic component for changing, controlling, or transmitting the amount of current supplied to the driving coils 420 and 422 or the direction of the supplied current. The substrate 700 may be configured in a form capable of bending deformation. For example, the substrate 700 may be configured in the form of an FPCB.

The shield can 900 may be configured to protect main components of the camera module 14 from external electromagnetic waves. For example, the shield can 900 may be formed of a metal material to block electromagnetic wave penetration into the camera module 14.

The camera module 14 may further include yoke members 512 and 522. The yoke members 512 and 522 may be disposed on the barrel holder 300. The yoke members 512 and 522 may be disposed in positions overlapping the driving magnets 410 and 412. For example, the first yoke member 512 may be disposed in the mounting groove 312, and the second yoke member 514 may be disposed in the mounting groove 314. The yoke members 512 and 522 may increase the magnetic force of the driving magnets 410 and 412. For example, the yoke members 512 and 522 may increase magnetic force generated between the driving magnets 410 and 412 and the driving coils 420 and 422 or may increase attractive force generated between the driving magnets 410 and 412 and the position restoration members 510 and 520.

Figure 10:
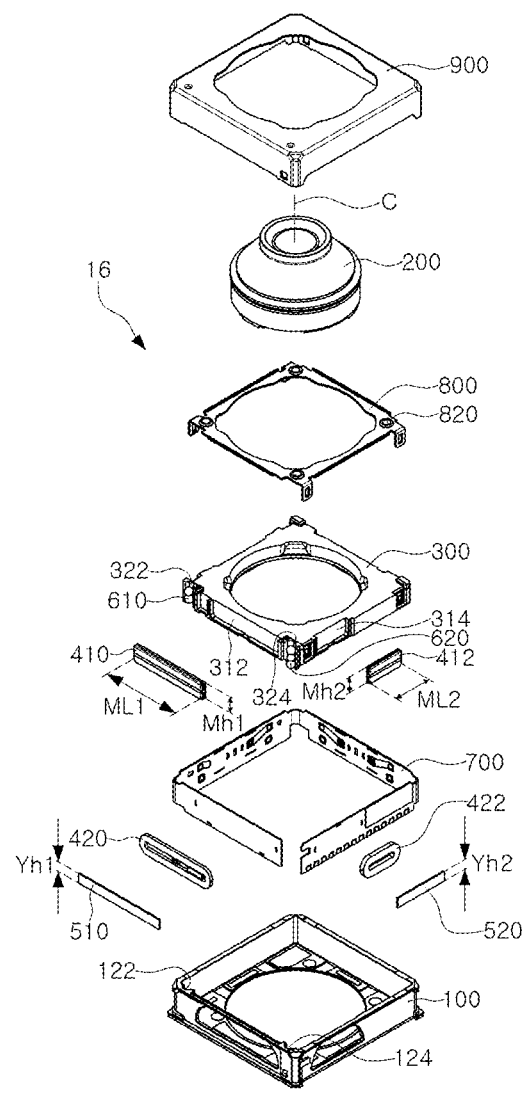
FIG. 10 is an exploded perspective view of an example camera module, according to one or more embodiments.

Further, as demonstrated in FIGS. 9 and 10, the lens barrel 200 and the barrel holder 300 may move in the direction of the optical axis C. For example, the lens barrel 200 and the barrel holder 300 may be moved upwardly or downwardly by a predetermined magnitude (AFL/2) by the driving force of the driving magnets 410 and 412 and the driving coils 420 and 422. For reference, AFL is a maximum or total displacement of the lens barrel 200.

The position restoration members 510 and 520 may be configured to partially limit the movement of the lens barrel 200. For example, the position restoration members 510 and 520 may be configured to reduce a phenomenon in which the lens barrel 200 moves by displacement (AFL) or more due to external impacts, or the lens barrel 200 is regularly or irregularly shaken due to external impacts. For example, the position restoration members 510 and 520 may act to suppress movement of the lens barrel 200 and the barrel holder 300 or to gradually decrease the width of the movement, through interaction (attractive force) with the driving magnets 410 and 412 fixed to the barrel holder 300. The attractive force generated between the position restoration members 510 and 520 and the driving magnets 410 and 412 may be less than the attractive force generated between the driving magnets 410 and 412 and the driving coils 420 and 422 in the driving state of the lens barrel 200, and may be greater than the attractive force generated between the driving magnets 410 and 412 and the driving coils 420 and 422 in the non-driving state of the lens barrel 200. The position restoration members 510 and 520 may form a predetermined size relationship with the displacement AFL of the lens barrel 200 and the driving magnets 410 and 412. For example, the total height Yh1 of the first position restoration member 510 may be less than a sum (Mh1+AFL/2) of the total; height Mh1 of the first driving magnet 410 and one-half of the displacement (AFL), and the total height Yh2 of the second position restoration member 520 may be less than a sum (Mh2+AFL/2) of the total height Mh2 of the second driving magnet 412 and one-half of the displacement AFL. In addition, the total heights Yh1 and Yh2 of the position restoration members 510 and 520 may be respectively less than the total heights Mh1 and Mh2 of the driving magnets 410 and 412, facing each other.

The camera module 14 configured as above may reduce or suppress shaking of the lens barrel 200 and the barrel holder 300 due to external impacts. For example, when the lens barrel 200 and the barrel holder 300 move upwardly or vibrate due to external impacts, the position restoration members 510 and 520 interact with the driving magnets 410 and 412 and may pull the lens barrel 200 and the barrel holder 300 downwardly through the generated attractive force. Conversely, when the lens barrel 200 and the barrel holder 300 move downwardly or vibrate due to external impacts, the position restoration members 510 and 520 may interact with the driving magnets 410 and 412 and may pull the lens barrel 200 and the barrel holder 300 upwardly through the generated attractive force. Therefore, the camera module according to one or more embodiments may reduce sudden movement or vibration of the lens barrel 200 and the barrel holder 300 due to external impacts, as well as the lens barrel 200 and the barrel holder 300 may also reduce the noise caused by sudden movements or vibration.

In addition, the camera module according to one or more embodiments may secure horizontal stability of the lens barrel 200 and the barrel holder 300. For example, the driving magnets 410 and 412 disposed on one side and another side of the lens barrel 200 may alleviate the phenomenon in which the lens barrel 200 and the barrel holder 300 are shaken or inclined in a direction oblique to the optical axis C. In addition, the ball bearings 610 and 620 disposed at diagonal positions of the housing 100 may enable the lens barrel 200 and the barrel holder 300 to be stably driven in the optical axis direction. Accordingly, the camera module according one or more embodiments may improve reliability of movement of the lens barrel 200 and the barrel holder 300 in the optical axis direction.

Figure 11:
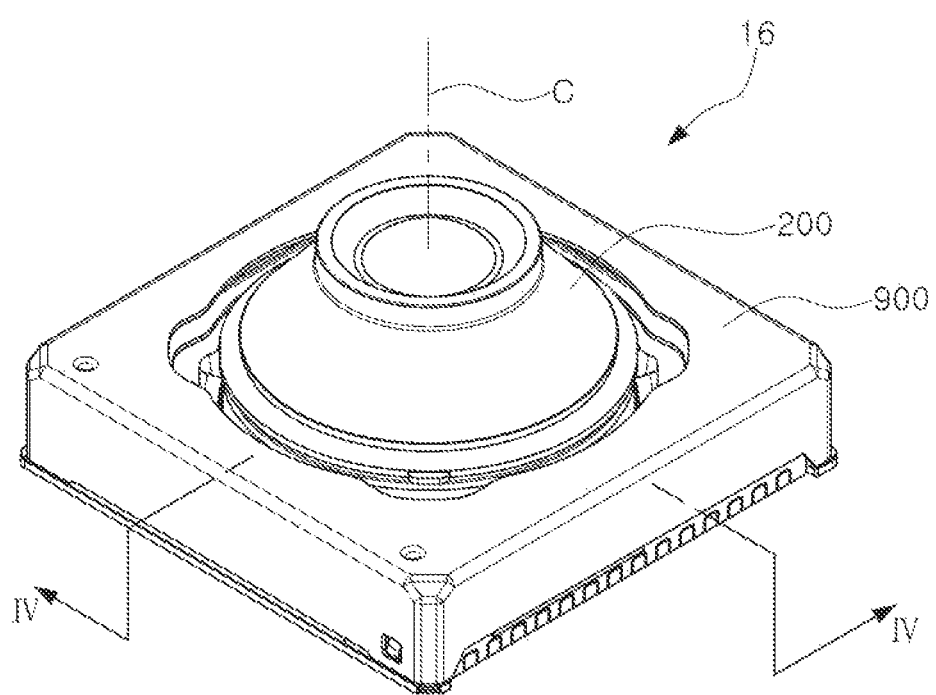
FIG. 11 is a combined perspective view of an example camera module, according to one or more embodiments.
Figure 12:
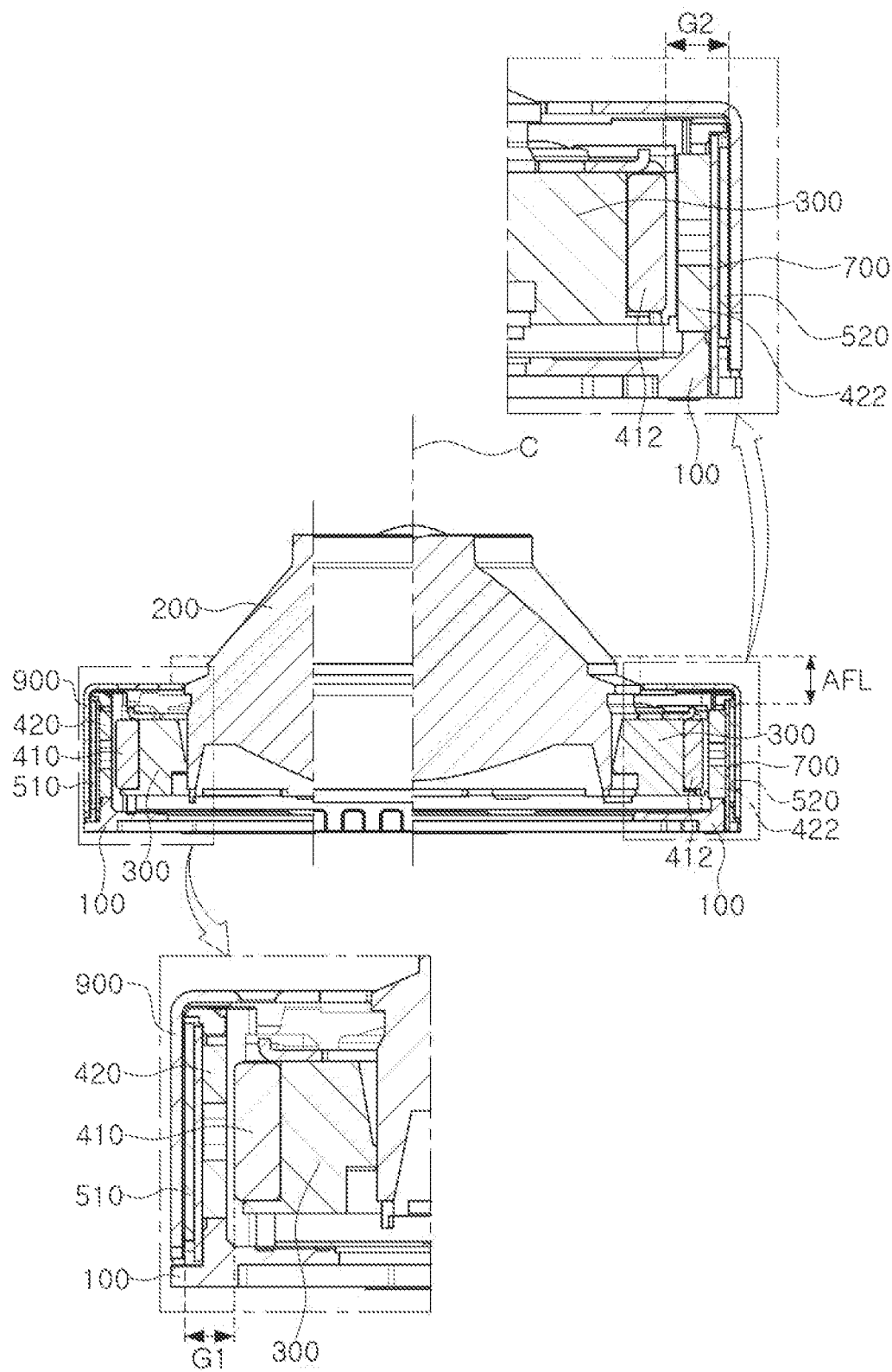
FIG. 12 is a cross-sectional view of an example camera module, according to one or more embodiments.

FIG. 10 is an exploded perspective view of an example camera module, according to one or more embodiments. FIG. 11 is a combined perspective view of an example camera module, according to one or more embodiments. FIG. 12 is a cross-sectional view of an example camera module, according to one or more embodiments.

For example, as demonstrated in FIGS. 10-12, a camera module 16 according to one or more embodiments includes a housing 100, a lens barrel 200, a barrel holder 300, driving units 402 and 404, position restoration members 510 and 520, and a substrate 700. However, the configuration of the camera module 16 is not limited to the above-described configurations. For example, the camera module 16 may further include a ball bearing 600, a clip member 800, a shield can 900, and an image sensor.

The housing 100 may be configured in a polyhedral shape having a substantially quadrangular cross section and a predetermined height. However, the shape of the housing 100 is not limited to a polyhedral shape having a quadrangular cross section. The housing 100 is configured to accommodate the lens barrel 200. For example, a space capable of accommodating at least a portion of the lens barrel 200 may be formed inside of the housing 100. The housing 100 is configured to allow movement of the lens barrel 200 in the optical axis (C) direction. For example, the upper and lower surfaces of the housing 100 may be open. The housing 100 may be configured to enable the arrangement of the driving units 402 and 404. For example, as shown in FIGS. 4 and 7, openings 106 and 108 may be formed in one side of the housing 100 such that different members of the driving units 402 and 404 may be disposed to face each other directly.

The lens barrel 200 may be formed to have a substantially cylindrical shape. However, the shape of the lens barrel 200 is not limited to being cylindrical. The lens barrel 200 includes one or more lenses. For example, the lens barrel 200 may include four or more lenses. However, the number of lenses accommodated in the lens barrel 200 is not limited to four. For example, the lens barrel 200 may be configured to accommodate 3 or less or 5 or more lenses. The lens barrel 200 is configured to be accommodated in the housing 100. For example, the cross-sectional size of the lens barrel 200 may be less than the inner cross-sectional size of the housing 100. The lens barrel 200 may move in the optical axis C direction. For example, the lens barrel 200 may be moved in the direction of the optical axis C while being accommodated in the housing 100, by the driving force of the driving units 402 and 404.

The barrel holder 300 may be coupled to the lens barrel 200. The barrel holder 300 may support the lens barrel 200 such that the lens barrel 200 may be stably moved in the inner space of the housing 100. The lens barrel 200 may be formed in a shape substantially similar to the inner space of the housing 100. For example, the cross-sectional shape of the lens barrel 200 may have the same or similar quadrangular shape as the inner space of the housing 100. The barrel holder 300 may provide a space for supporting some components of the driving units 402 and 404. For example, mounting grooves 312 and 314 in which the driving magnets 410 and 412 are to be disposed may be formed in sides of the barrel holder 300.

The driving units 402 and 404 may provide driving force required for driving the lens barrel 200. For example, the driving units 402 and 404 may drive the lens barrel 200 in the direction of the optical axis C through magnetic force. The driving units 402 and 404 may include the first driving unit 402 configured to provide driving force to one side of the lens module 200 and the lens barrel 300, and the second driving unit 404 configured to provide driving force to the other side of the lens module 200 and the lens barrel 300. The driving units 402 and 404 may include driving magnets 410 and 412 and driving coils 420 and 422. The driving magnets 410 and 412 may be disposed on the barrel holder 300. For example, the driving magnets 410 and 412 may be disposed in the mounting grooves 312 and 314 of the barrel holder 300, respectively. The driving magnets 410 and 412 may be disposed to substantially face the driving coils 420 and 422. For example, the driving magnets 410 and 412 and the driving coils 420 and 422 may be disposed to face each other through the openings 106 and 108 of the housing 100. The driving coils 420 and 422 may be disposed in the openings 106 and 108 of the housing 100, respectively. For example, the driving coils 420 and 422 may be disposed inside of the openings 106 and 108 using the substrate 700 surrounding the openings 106 and 108 of the housing 100, respectively. The first driving magnet 410 and the second driving magnet 412 may have different sizes. For example, a total length ML1 of the first driving magnet 410 may be greater than a total length ML2 of the second driving magnet 412. As another example, the total length ML2 of the second driving magnet 412 may be about 0.3 to 0.7 of the total length ML1 of the first driving magnet 410.

As another example, the total length ML1 of the first driving magnet 410 and the total length ML2 of the second driving magnet 412 may satisfy the following relational expression:

$$0.3 \leq (ML1/G1)/(ML2/G2) \leq 0.7$$

For reference, G1 is a shortest distance between the first driving magnet 410 and the first position restoration member 510, G2 is a shortest distance between the second driving magnet 412 and the second position restoration member 520, and the first driving coil 420 and the second driving coil 422 may also have the same or similar size relationship to that of the first driving magnet 410 and the second driving magnet 412.

The position restoration members 510 and 520 may be disposed to directly or indirectly face the driving magnets 410 and 412 of the driving units 402 and 404. For example, the position restoration members 510 and 520 may be disposed outside of the openings 106 and 108 using the substrate 700. The position restoration members 510 and 520 may be configured to generate an attractive force of a predetermined magnitude through interaction with the driving magnets 410 and 412. For example, the position restoration members 510 and 520 may be formed of a magnetic material. However, one or more embodiments further include position restoration members 510 and 520 being formed of materials in addition to only magnetic material(s). For example, the position restoration members 510 and 520 may be formed of a mixture or a composite of a magnetic material and another material. The position restoration members 510 and 520 may have a predetermined size. For example, the total heights Yh1 and Yh2 of the position restoration members 510 and 520 may be respectively less than the total heights Mh1 and Mh2 of the corresponding driving magnets 410 and 412. For example, the total height Yh1 of the first position restoration member 510 is less than the total height Mh1 of the first driving magnet 410, and the total height Yh2 of the second position restoration member 520 is less than the total height Mh2 of the second driving magnet 412. The centers Yc1 and Yc2 of the position restoration members 510 and 520 may be disposed to substantially coincide with the winding centers Wc1 and Wc2 of the corresponding driving coils 420 and 422. For example, the center Yc1 of the first position restoration member 510 is disposed to coincide with the winding center Wc1 of the first driving coil 420, and the center Yc2 of the second position restoration member 520 is disposed to coincide with the winding center Wc2 of the second driving coil 422. However, one or more embodiments also include the centers Yc1 and Yc2 of the position restoration members 510 and 520 not being disposed to match the winding centers Wc1 and Wc2 of the corresponding driving coils 420 and 422. For example, the centers Yc1 and Yc2 of the position restoration members 510 and 520 may be disposed to be deflected in the direction of the optical axis C from the winding centers Wc1 and Wc2 of the driving coils 420 and 422.

The ball bearings 610 and 620 may be disposed between the housing 100 and the barrel holder 300. For example, the ball bearings 610 and 620 may be disposed between the guide grooves 122 and 124 formed in one surface of the housing 100 and the guide grooves 322 and 324 formed in one surface of the barrel holder 300. The ball bearings 610 and 620 are configured to enable smooth driving of the lens barrel 200. For example, the ball bearings 610 and 620 may be in point contact with the barrel holder 300 in a state in which direct contact between the barrel holder 300 and the housing 100 is blocked. Accordingly, the lens barrel 200 may move smoothly in the direction of the optical axis C along the barrel holder 300 in point contact with the ball bearings 610 and 620. The ball bearings 610 and 620 may be configured in plural. For example, two pairs of ball bearings 610 and 620 may be sequentially disposed between the guide grooves 122 and 124 of the housing 100 and the guide grooves 322 and 324 of the barrel holder 300. However, the number of ball bearings 610 and 620 is not limited to two pairs. For example, three or more pairs of ball bearings 610 and 620 may be disposed between the guide grooves 122 and 124 of the housing 100 and the guide grooves 322 and 324 of the barrel holder 300.

The substrate 700 may be disposed to surround the openings 106 and 108 of the housing 100. The substrate 700 may be electrically connected to the driving units 402 and 404. For example, the substrate 700 may be electrically connected to the driving coils 420 and 422 of the driving units 402 and 404. The substrate 700 may include a component for directly or indirectly controlling the driving units 402 and 404. For example, the substrate 700 may include an electric circuit or electronic component for changing, controlling, or transmitting the amount of current supplied to the driving coils 420 and 422 or the direction of the supplied current. The substrate 700 may be configured in a form capable of bending deformation. For example, the substrate 700 may be configured in the form of an FPCB. The substrate 700 may be formed to surround a side surface of the housing 100. For example, the substrate 700 according to one or more embodiments may be formed to surround all four sides of the housing 100.

The clip member 800 is configured to be coupled to the barrel holder 300. For example, the clip member 800 may be coupled to the barrel holder 300 through a configuration of a protrusion and a groove. For reference, FIG. 10 illustrates that a protrusion is formed on the barrel holder 300 and a coupling groove is formed in the clip member 800, but a coupling groove may also be formed in the barrel holder 300 and a protrude may also be formed on the clip member 800. A buffer member 820 may be formed on the clip member 800. The buffer member 820 may be formed of a material capable of elastic deformation. For example, the buffer member 820 may be formed of urethane foam, epoxy resin, natural rubber, synthetic rubber, or the like. The buffer member 820 may reduce collision energy between the barrel holder 300 and the shield can 900. For example, the buffer member 820 may absorb or reduce energy generated in a collision process between the barrel holder 300 and the shield can 900 through elastic deformation.

The shield can 900 may be configured to protect main components of the camera module 16 from external electromagnetic waves. For example, the shield can 900 may be formed of a metal material to block electromagnetic wave penetration into the camera module 16.

Further, as demonstrated in FIG. 12, the lens barrel 200 and the barrel holder 300 may move in the direction of the optical axis C. For example, the lens barrel 200 and the barrel holder 300 may be moved upwardly or downwardly by a predetermined magnitude (AFL/2) by the driving force of the driving magnets 410 and 412 and the driving coils 420 and 422. For reference, AFL is a maximum displacement of the lens barrel 200.

The position restoration members 510 and 520 may be configured to partially limit the movement of the lens barrel 200. For example, the position restoration members 510 and 520 may be configured to reduce the phenomenon in which the lens barrel 200 moves by the displacement (AFL) or more due to external impacts, or the lens barrel 200 is regularly or irregularly shaken due to external impacts. For example, the position restoration members 510 and 520 may act to suppress movement of the lens barrel 200 and the barrel holder 300 or to gradually decrease the width of the movement through interaction (attractive force) with the driving magnets 410 and 412 fixed to the barrel holder 300. The attractive force generated between the position restoration members 510 and 520 and the driving magnets 410 and 412 may be less than the attractive force generated between the driving magnets 410 and 412 and the driving coils 420 and 422 in the driving state of the lens barrel 200, and may be greater than the attractive force generated between the driving magnets 410 and 412 and the driving coils 420 and 422 in the non-driving state of the lens barrel 200. The position restoration members 510 and 520 may form a predetermined size relationship with the displacement AFL of the lens barrel 200 and the driving magnets 410 and 412. For example, the total height Yh1 of the first position restoration member 510 may be less than a sum (Mh1+AFL/2) of the total height Mh1 of the first driving magnet 410 and one-half of the displacement AFL, and the total height Yh2 of the second position restoration member 520 may be less than a sum (Mh2+AFL/2) of the total height Mh2 of the second driving magnet 412 and one-half of the displacement AFL. In addition, the total heights Yh1 and Yh2 of the position restoration members 510 and 520 may be respectively less than the total heights Mh1 and Mh2 of the driving magnets 410 and 412, facing each other.

The camera module 16 configured as above may reduce or suppress shaking of the lens barrel 200 and the barrel holder 300 due to external impacts. For example, when the lens barrel 200 and the barrel holder 300 move upwardly or vibrate due to external impacts, the position restoration members 510 and 520 may pull the lens barrel 200 and the barrel holder 300 downwardly through interaction (attractive force) with the driving magnets 410 and 412. Conversely, when the lens barrel 200 and the barrel holder 300 move downwardly or vibrate due to external impacts, the position restoration members 510 and 520 may pull the lens barrel 200 and the barrel holder 300 upwardly through interaction (attractive force) with the driving magnets 410 and 412. Accordingly, the camera module according to one or more embodiments may reduce noise caused by sudden movement or vibration of the lens barrel 200 and the barrel holder 300, as well as reducing the rapid movement or vibration of the lens barrel 200 and the barrel holder 300 due to external impacts.

In addition, the camera module according to one or more embodiments may secure horizontal stability of the lens barrel 200 and the barrel holder 300. For example, the driving magnets 410 and 412 disposed on one side and another side of the lens barrel 200 may alleviate a phenomenon in which the lens barrel 200 and the barrel holder 300 are shaken or inclined in a direction obliquely to the optical axis C. In addition, the ball bearings 610 and 620 disposed at diagonal positions of the housing 100 may enable the lens barrel 200 and the barrel holder 300 to be stably driven in the optical axis direction. Accordingly, the camera module according to one or more embodiments may improve reliability of movement of the lens barrel 200 and the barrel holder 300 in the optical axis direction.

Thus, as set forth above with respect to FIGS. 1-12, according to one or more embodiments, shaking effects of the lens barrel of one or more camera modules of an electronic device, e.g., due to external impacts, may be significantly reduced. As noted above, in one or more examples, the electronic device is a mobile or portable electronic device, such as a mobile phone or computer.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module comprising:
a housing;
a lens barrel disposed in the housing;
a lens barrel driving unit including a driving magnet and a driving coil, configured to drive the lens barrel in an optical axis direction; and
a position restoration member disposed to face the driving magnet,
wherein the driving magnet and the driving coil substantially face each other in a direction perpendicular to the optical axis direction, and
wherein a conditional expression $Yh<(Mh-AFL/2)$ is satisfied,
where Yh is a total length of the position restoration member in the optical axis direction, Mh is a total length of the driving magnet in the optical axis direction, and AFL is a maximum displacement of the lens barrel in the optical axis direction.

2. The camera module of claim 1, further comprising one or more ball bearings disposed between the lens barrel and the housing.

3. The camera module of claim 1, wherein the lens barrel driving unit comprises:
a first driving magnet and a first driving coil configured to provide driving force to one side of the lens barrel; and
a second driving magnet and a second driving coil configured to provide another driving force to another side of the lens barrel.

4. The camera module of claim 3, wherein the first driving magnet is configured to have a total length (ML1) that is different from a total length (ML2) of the second driving magnet.

5. The camera module of claim 4, wherein a ratio (ML1/ML2) between the total length (ML1) of the first driving magnet and the total length (ML2) of the second driving magnet is 0.3 to 0.7.

6. The camera module of claim 3,
wherein the position restoration member is disposed to face the first driving magnet, and Mh is the total length of the first driving magnet in the optical axis direction, and
wherein the camera module further comprises another position restoration member disposed to face the second driving magnet.

7. The camera module of claim 6, wherein another conditional expression $Yh2<(Mh2-AFL/2)$ is satisfied,
where Yh2 is a total length of the other position restoration member in the optical axis direction, and Mh2 is a total length of the second driving magnet in the optical axis direction.

8. The camera module of claim 1, wherein the total length (Yh) of the position restoration member in the optical axis direction is less than the total length (Mh) of the driving magnet in the optical axis direction.

9. A camera module comprising:
a housing;
a lens barrel configured to be movable in an optical axis direction;
a barrel holder coupled to the lens barrel and disposed inside of the housing;
a lens barrel driving unit configured to drive the lens barrel in the optical axis direction, and including a driving magnet and a driving coil; and
a position restoration member configured to face the driving magnet in a direction intersecting an optical axis, wherein the driving magnet and the driving coil substantially face each other in a direction perpendicular to the optical axis direction, and wherein a conditional expression $Yh<(Mh-AFL/2)$ is satisfied, where Yh is a total length of the position restoration member in the optical axis direction, Mh is a total length of the driving magnet in the optical axis direction, and AFL is a maximum displacement of the lens barrel in the optical axis direction.

10. The camera module of claim 9, wherein the position restoration member applies a passive attractive force to the driving magnet to limit the displacement of the lens barrel in the optical axis direction.

11. The camera module of claim 9, further comprising one or more ball bearings disposed between a guide groove of the housing and a guide groove of the barrel holder.

12. The camera module of claim 11, wherein the one or more ball bearings include two or more ball bearings, and the two or more ball bearing are respectively disposed at portions of diagonal corners of the housing and the barrel holder.

13. The camera module of claim 11, wherein the one or more ball bearings include two or more ball bearings, and the two or more ball bearing are disposed between one surface of the housing and one surface of the barrel holder.

14. The camera module of claim 9, wherein the lens barrel driving unit comprises:

a first driving magnet and a first driving coil configured to provide driving force to one side of the lens barrel; and a second driving magnet and a second driving coil configured to provide another driving force to another side of the lens barrel.

15. The camera module of claim 14, wherein the first driving magnet is configured to have a total length (ML1) different from a total length (ML2) of the second driving magnet.

16. The camera module of claim 15, wherein a ratio (ML1/ML2) between the total length (ML1) of the first driving magnet and the total length (ML2) of the second driving magnet is 0.3 to 0.7.

17. The camera module of claim 14, wherein the position restoration member is disposed to face the first driving magnet, Yh1 is the total length of the position restoration member in the optical axis direction, Mh1 is the total length of the first driving magnet in the optical axis direction, AFL is a maximum displacement of the lens barrel in the optical axis direction, and a conditional expression $Yh1<(Mh1-AFL/2)$ is satisfied, and wherein the camera module further comprises another position restoration member disposed to face the second driving magnet, where Yh2 is a total length of the other position restoration member in the optical axis direction, Mh2 is a total length of the second driving magnet in the optical axis direction, and another conditional expression $Yh2<(Mh2-AFL/2)$ is satisfied.

18. The camera module of claim 9, further comprising a circuit board disposed to surround an open portion of the housing and electrically connected to the driving coil.

19. The camera module of claim 9, further comprising a shield can that is coupled to the housing and configured to block external electromagnetic waves.

20. The camera module of claim 19, further comprising:

a clip member coupled to the barrel holder; and a buffer member disposed on the clip member.

* * * * *